US008019532B2

(12) United States Patent
Sheha et al.

(10) Patent No.: US 8,019,532 B2
(45) Date of Patent: Sep. 13, 2011

(54) METHOD AND SYSTEM FOR IDENTIFYING AND DEFINING GEOFENCES

(75) Inventors: Michael A. Sheha, Laguna Niguel, CA (US); Angie Sheha, Laguna Niguel, CA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 124 days.

(21) Appl. No.: 11/370,794

(22) Filed: Mar. 7, 2006

(65) Prior Publication Data

US 2006/0200305 A1 Sep. 7, 2006

Related U.S. Application Data

(60) Provisional application No. 60/659,643, filed on Mar. 7, 2005.

(51) Int. Cl.
*G01C 21/26* (2006.01)
(52) U.S. Cl. ........ 701/200; 701/202; 701/206; 701/208; 701/212; 340/995.1; 340/995.14; 340/995.24; 340/996
(58) Field of Classification Search .................. 701/201, 701/209, 211
See application file for complete search history.

(56) References Cited

U.S. PATENT DOCUMENTS

| | | | |
|---|---|---|---|
| 4,737,916 A * | 4/1988 | Ogawa et al. ................. | 701/200 |
| 4,939,662 A | 7/1990 | Numura | |
| 5,389,934 A | 2/1995 | Kass | |
| 5,557,254 A | 9/1996 | Johnson | |
| 5,636,122 A | 6/1997 | Shah | |
| 5,684,951 A | 11/1997 | Goldman | |
| 5,689,269 A | 11/1997 | Norris | |
| 5,689,809 A | 11/1997 | Grube | |
| 5,727,057 A | 3/1998 | Emery | |
| 5,774,824 A | 6/1998 | Streit | |
| 5,801,700 A | 9/1998 | Ferguson | |
| 5,802,492 A | 9/1998 | DeLorme | |
| 5,926,118 A | 7/1999 | Hayashida | |
| 5,944,768 A | 8/1999 | Ito | |
| 6,035,253 A * | 3/2000 | Hayashi et al. ............... | 701/211 |
| 6,091,957 A | 7/2000 | Larkins | |
| 6,138,003 A | 10/2000 | Kingdon | |
| 6,169,516 B1 | 1/2001 | Watanabe | |
| 6,182,006 B1 | 1/2001 | Meek | |
| 6,182,227 B1 | 1/2001 | Blair | |
| 6,185,426 B1 | 2/2001 | Alperovich | |

(Continued)

OTHER PUBLICATIONS

Supplementary European Search Report in European Appl. No. 02 75 0138 dated Oct. 13, 2010.

(Continued)

*Primary Examiner* — Jack Keith
*Assistant Examiner* — Jonathan M Dager
(74) *Attorney, Agent, or Firm* — William H. Bollman (57) ABSTRACT

The preferred embodiments of the present invention are directed to an improved mapping and navigational system. Specifically, the present invention is directed to a system for defining and assigning geographical boundaries to points of interests on a graphical map, where the geographical boundaries preferably correlate to spatially defined boundaries of the respective points of interests. In accordance with one embodiment of the present invention, the points of interest, along with the respective defined geographical boundaries, can be transferred from a personal computing device to a telecommunication device, such as a portable communication device, so as to be used for mapping purposes and to set off proximity alerts when the portable communication device, equipped with a GPS unit, enters or exits the geographical boundary of a particular point of interest.

22 Claims, 7 Drawing Sheets

U.S. PATENT DOCUMENTS

| | | | |
|---|---|---|---|
| 6,188,957 B1 | 2/2001 | Bechtolsheim | |
| 6,204,844 B1 | 3/2001 | Fumarolo | |
| 6,317,684 B1 | 11/2001 | Roeseler | |
| 6,321,158 B1* | 11/2001 | DeLorme et al. | 701/201 |
| 6,331,825 B1 | 12/2001 | Ladner | |
| 6,366,782 B1 | 4/2002 | Fumarolo | |
| 6,366,856 B1 | 4/2002 | Johnson | |
| 6,397,143 B1* | 5/2002 | Peschke | 701/208 |
| 6,415,224 B1 | 7/2002 | Wako | |
| 6,441,752 B1 | 8/2002 | Fomukong | |
| 6,442,384 B1 | 8/2002 | Shah | |
| 6,442,391 B1 | 8/2002 | Johansson | |
| 6,466,788 B1 | 10/2002 | Carlsson | |
| 6,563,824 B1 | 5/2003 | Bhatia | |
| 6,571,174 B2 | 5/2003 | Rigazio | |
| 6,609,062 B2* | 8/2003 | Hancock | 701/200 |
| 6,621,423 B1 | 9/2003 | Cooper | |
| 6,640,185 B2 | 10/2003 | Yokota | |
| 6,661,353 B1* | 12/2003 | Gopen | 340/973 |
| 6,665,613 B2* | 12/2003 | Duvall | 701/213 |
| 6,665,715 B1 | 12/2003 | Houri | |
| 6,678,611 B2* | 1/2004 | Khavakh et al. | 701/210 |
| 6,721,652 B1* | 4/2004 | Sanqunetti | 701/207 |
| 6,766,174 B1 | 7/2004 | Kenyon | |
| 6,768,818 B2* | 7/2004 | Friederich et al. | 382/233 |
| 6,801,850 B1 | 10/2004 | Wolfson | |
| 6,816,782 B1 | 11/2004 | Walters | |
| 6,819,919 B1 | 11/2004 | Tanaka | |
| 6,842,696 B2 | 1/2005 | Silvester | |
| 6,845,321 B1* | 1/2005 | Kerns | 701/209 |
| 6,885,874 B2 | 4/2005 | Grube | |
| 6,895,329 B1 | 5/2005 | Wolfson | |
| 6,898,516 B2 | 5/2005 | Pechatnikov | |
| 6,925,603 B1 | 8/2005 | Naito | |
| 6,934,705 B2 | 8/2005 | Tu | |
| 6,956,590 B1* | 10/2005 | Barton et al. | 345/684 |
| 6,970,871 B1 | 11/2005 | Rayburn | |
| 7,058,506 B2 | 6/2006 | Kawase | |
| 7,079,945 B1 | 7/2006 | Kaplan | |
| 7,089,110 B2* | 8/2006 | Pechatnikov et al. | 701/210 |
| 7,096,117 B1* | 8/2006 | Gale et al. | 701/208 |
| 7,099,882 B2* | 8/2006 | McDonough | 707/100 |
| 7,142,196 B1 | 11/2006 | Connor | |
| 7,142,205 B2 | 11/2006 | Chithambaram | |
| 7,155,335 B2* | 12/2006 | Rennels | 701/117 |
| 7,171,304 B2* | 1/2007 | Wako | 701/200 |
| 7,197,500 B1* | 3/2007 | Israni et al. | 707/100 |
| 7,202,801 B2 | 4/2007 | Chou | |
| 7,266,376 B2 | 9/2007 | Nakagawa | |
| 7,266,560 B2* | 9/2007 | Lampert et al. | 707/101 |
| 7,286,929 B2* | 10/2007 | Staton et al. | 701/206 |
| 7,412,398 B1* | 8/2008 | Bailey | 705/10 |
| 7,565,157 B1 | 7/2009 | Ortega | |
| 7,739,033 B2 | 6/2010 | Murata | |
| 7,751,614 B2 | 7/2010 | Funakura | |
| 7,774,003 B1 | 8/2010 | Ortega | |
| 7,822,823 B2 | 10/2010 | Jhanji | |
| 7,881,730 B2 | 2/2011 | Sheha | |
| 2002/0032036 A1 | 3/2002 | Nakajima | |
| 2002/0069239 A1 | 6/2002 | Katada | |
| 2002/0086683 A1 | 7/2002 | Kohar | |
| 2002/0130906 A1* | 9/2002 | Miyaki | 345/837 |
| 2002/0169539 A1 | 11/2002 | Menard | |
| 2003/0014487 A1 | 1/2003 | Iwakawa | |
| 2003/0036848 A1* | 2/2003 | Sheha et al. | 701/209 |
| 2003/0036949 A1 | 2/2003 | Kaddeche | |
| 2003/0045327 A1 | 3/2003 | Kobayashi | |
| 2003/0060938 A1* | 3/2003 | Duvall | 701/2 |
| 2003/0078054 A1 | 4/2003 | Okuda | |
| 2003/0126250 A1 | 7/2003 | Jhanji | |
| 2003/0151501 A1* | 8/2003 | Teckchandani et al. | 340/426.19 |
| 2003/0165254 A1 | 9/2003 | Chen et al. | 382/103 |
| 2003/0182052 A1* | 9/2003 | DeLorme et al. | 701/201 |
| 2003/0210825 A1* | 11/2003 | Friederich et al. | 382/246 |
| 2003/0231190 A1* | 12/2003 | Jawerth et al. | 345/660 |
| 2003/0236618 A1* | 12/2003 | Kamikawa et al. | 701/211 |
| 2004/0002814 A1* | 1/2004 | Gogic | 701/214 |
| 2004/0008225 A1 | 1/2004 | Campbell | |
| 2004/0021567 A1* | 2/2004 | Dunn | 340/539.13 |
| 2004/0054428 A1* | 3/2004 | Sheha et al. | 700/56 |
| 2004/0186880 A1 | 9/2004 | Yamamoto | |
| 2004/0204829 A1 | 10/2004 | Endo | |
| 2004/0205517 A1* | 10/2004 | Lampert et al. | 715/502 |
| 2004/0220957 A1* | 11/2004 | McDonough | 707/102 |
| 2005/0027445 A1* | 2/2005 | McDonough | 701/208 |
| 2005/0085999 A1* | 4/2005 | Onishi | 701/211 |
| 2005/0125148 A1 | 6/2005 | Van Buer | |
| 2005/0156715 A1* | 7/2005 | Zou et al. | 340/426.19 |
| 2005/0159883 A1* | 7/2005 | Humphries et al. | 701/207 |
| 2005/0219067 A1 | 10/2005 | Chung | |
| 2005/0270311 A1* | 12/2005 | Rasmussen et al. | 345/677 |
| 2006/0015233 A1* | 1/2006 | Olsen et al. | 701/50 |
| 2006/0019724 A1 | 1/2006 | Bahl | |
| 2006/0041375 A1* | 2/2006 | Witmer et al. | 701/208 |
| 2006/0074547 A1* | 4/2006 | Kaufman et al. | 701/200 |
| 2006/0200359 A1* | 9/2006 | Khan et al. | 705/1 |
| 2006/0268120 A1 | 11/2006 | Funakura | |
| 2006/0270421 A1* | 11/2006 | Phillips et al. | 455/457 |
| 2007/0032244 A1 | 2/2007 | Counts | |
| 2007/0139411 A1* | 6/2007 | Jawerth et al. | 345/440 |
| 2008/0048890 A1* | 2/2008 | Sheha et al. | 340/995.1 |
| 2008/0129475 A1 | 6/2008 | Breed | |
| 2008/0195314 A1* | 8/2008 | Green | 701/211 |
| 2009/0177557 A1* | 7/2009 | Klein | 705/26 |
| 2009/0328163 A1 | 12/2009 | Preece | |
| 2010/0268848 A1 | 10/2010 | Maurya | |

OTHER PUBLICATIONS

Supplementary European Search Report in European Appl. No. 06839236.4 dated Dec. 6, 2010.

* cited by examiner

METHOD AND SYSTEM FOR IDENTIFYING AND DEFINING GEOFENCES

CROSS-REFERENCE TO RELATED APPLICATIONS

The present invention claims the benefit under 35 USC 119(e) of U.S. provisional patent application Ser. No. 60/659,643 filed Mar. 7, 2005, the contents of which are incorporated by reference herein.

BACKGROUND ART

1. Field of Invention

This present invention relates to a method and system for selecting, assigning, and creating Geofences based on using known map elements and/or point of interest (POI) data, such as parks, golf courses, schools, buildings, etc. using a plurality of user interface (UI) computing devices. Additionally, this invention combines the use of saving these Geofences on a Telecommunication Device (i.e., mobile device) that has location capability for the purpose of acting on said Geofences.

2. Description of the Related Art

Telecommunication devices, specifically wireless telephones, are achieving widespread use today. Such telecommunication devices are commonly used to establish communication between other telecommunication devices. Recently telecommunication devices are becoming more than just communication devices, but also a computing platform for executing applications similar to the early days of the personal computer era, where devices had limited memory and processing resources. The difference is that these new telecommunication devices, while currently provide a limited computing platform, also enable wireless data access to the Internet and expose the telephone's telephony functionality. These new telecommunication devices are well known to people that are skilled in the art.

Prior art systems, such as GPS enabled mobile devices, have been used in combination with Geofences, a common term to those that are skilled in the art, that defines a virtual spatial boundary (i.e., proximity range) for the purpose of creating triggers when the mobile location enabled devices enter and/or exit said boundaries. The prior art method for defining these boundaries requires the use of a graphical user interface (UI) tool for creating a polygon shaped "box" and/or trigger lines that are used to cause events to occur based on the crossing of said lines. Another prior art method of creating Geofences requires selecting a point feature, such as a latitude and longitude, and then defining either a radius or major/minor axis for the point feature in order to create a boundary around the point feature. This option can be offered using default values such that the user is required to enter little information, except the center location of the bounding box.

As people that are skilled in the art will agree, creating a geofence is a difficult spatial concept to represent in one's mind without the aid of a spatial map. Even then it is very difficult to fully represent due to map scales, etc. For example, a golf course might represent on a map an irregular shaped polygon which is hard to represent with a circle, rectangle, polygon, etc., and even more difficult to represent if a user has to draw the geofences using a GUI tool. Using such an irregularly shaped geofence is difficult for the user to establish in prior art methods, as well as difficult for inclusion into the mobile device, which will use the said geofences to act upon the required trigger events.

As people that are skilled in the art will appreciate, providing a means to significantly simplify this process to a "one-click" model would allow the use of implementing geofences for the inclusion into mass market devices, such as a wireless location-enabled cell phone, etc.

Until now, an adequate solution to these problems has eluded those skilled in the art. Thus, there exists a need to provide a solution that enables users to simply and easily create geofences that are based on real-world objects without the need to have to draw or model a geofence. For example, if a user would like to create a geofence for the "Bound Brook High School", then as those skilled in the art would appreciate, a user would only have select the map element, or in this case, the point of interest (POI), to create a geofence. This invention would correlate the spatially defined and recorded information and create a geofence boundary that emulates the actual spatially defined and recorded boundary of the object. This invention provides many important benefits for location-based applications which are an important and integral part of improving work flow and/or consumer related processes.

SUMMARY OF THE INVENTION

It is an object of the present invention to provide a method and system for enabling a very simple and efficient way to easily create and define geofences using a "one selection" process without the need to either a-priori know the extent of the object and/or define the boundary, such as using a map related object, such as a river, stream, ocean, lake, mountain, forest, reservoir, state, city, region, zip code, or the like, or using a point of interest (POI), such as a park, place of worship, school, university, restaurant, mall, or the like.

It is an object of the present invention to provide a method and system for using a "one selection" process for selecting a map or POI database that spatially represents the extents of an object. This map data and/or POI data however consists of the full and detailed spatial information that fully defines the object, such as a Park. In one embodiment, a Park feature is defined as a single and/or multiple polygon objects that fully represent the Park feature.

It is an object of the present invention to provide a method and system for allowing map related objects and/or POI objects to be represented using a plurality and various combinations of spatial representations, such as polygons, polylines, and/or point objects, to fully define the geofence that mirrors the actual map and/or POI object as accurately as possible.

It is another object of the present invention to provide a method and system for allowing map and/or POI point objects, which do not have extents, to use a default extent, such as a radius to define the objects correctly.

It is another object of the present invention to provide a method and system for allowing map and/or POI objects to automatically have varying extents based on other geofences and/or map related spatial data in the vicinity of the "selected" map or POI features for defining the extent of the object. For example, in one embodiment, a user that selects a restaurant, which is a point object, in a densely packed metropolitan area would have a default defined radius that would be much smaller than a similar restaurant in a sparse urban area. This algorithmic approach allows for a more intelligent means to create geofences for the purpose of preventing false positives, etc., when point features are within close proximity to other geofences and/or other map objects.

It is another object of the present invention to provide a method and system for storing these "one selection" geofences onto either a single server, cluster server, or the like, or on a mobile handset device which calculates the location information for the processing of the geofence triggers. In one embodiment, a handset that calculates the location information will also store the geofence data locally for use without the need of the network, such as the Internet, Intranet, Extranet, WDN (wireless data network), EDN (engineering data network), or the like, for the processing the geofences to cause trigger events. In another embodiment, the handset would send GPS points to a single or distributed and/or clustered server system for the processing of the geofence data. The latter embodiment requires more network traffic than processing the geofence data locally, since in this invention that data is differentially synchronized to the handset, which even further mitigates the required network bandwidth for this invention.

It is another object of the present invention to provide a method and system for representing a plurality of points that define the polygon. Since multiple points make it very difficulty to fully and correctly represent the actual polygon of the map data element and/or POI element for devices with limited resources, such as memory, disk space, etc., this invention provides the capability to decimate the polygon, polyline, or the like, into its minimal representation that represents the actually map object (i.e., map element and/or POI element). This invention also provides a method to decimate the polygon, polyline, or the like, below its minimal representation in order to satiate the limited resources of the device, such as a wireless phone.

It is another object of the present invention to provide a method and system for providing an interface to input this "one selection" process. This interface can consist of, but is not limited to, voice input, IVR, text, touch pad, keyboard, mouse, multi-modal, or the like, for the purpose of defining a geofence by selecting a map data element and/or POI element. For example, in one embodiment, a user can use an IVR voice input device to say the name of the POI, such as "Pasadena High School". This would indicate to the system that a geofence would be sent to the mobile location handset that would define a geofence around "Pasadena High School". In this embodiment, when the target mobile location handset either enters or leaves this geofence, certain event alerts would be triggered that the user had previously defined for the said handset.

It is another object of the present invention to provide a method and system to allow a user to select an object on a map, such as a map element and/or POI object for adding a geofence to a mobile device. A user only has to select the object to add it to the handset within the map view. Additionally, a user can also drag-and-drop the object to the representation of the mobile device for allowing the user to easily add a geofence to a mobile location-enabled device. This enables users to quickly and easily add geofences to devices without having to worry about the actual boundary and/or draw the polygon to represent the spatial representation that requires a geofence.

DETAILED DESCRIPTION OF THE EMBODIMENT

This present invention relates to a method and system for selecting, assigning, and creating Geofences based on using known map elements and/or point of interest (POI) data, such as parks, golf courses, schools, building, etc. using a plurality of user interface (UI) computing devices. Additionally, this invention combines the use of saving these Geofences on a Telecommunication Device (i.e., mobile device) that has location capability for the purpose of acting on said Geofences.

The present invention may be embodied in a pre-commercial (non-public) and internal application called "AtlasLink" which is owned and licensed by Networks In Motion, Inc. of Irvine, Calif.

Figure 1:
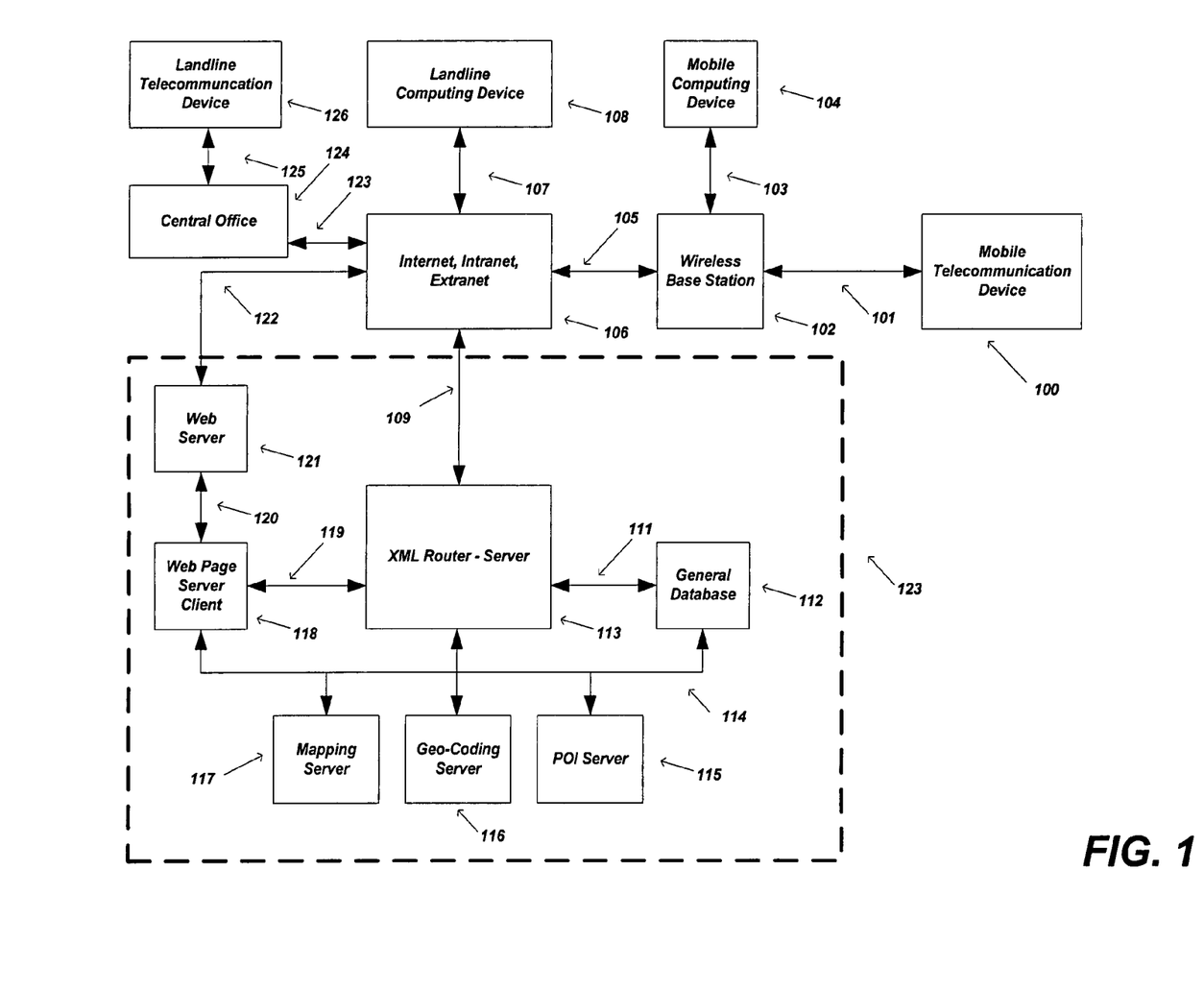
FIG. 1 illustrates a network system for providing a communication channel between various wireless and landline computing devices.
Figure 2:
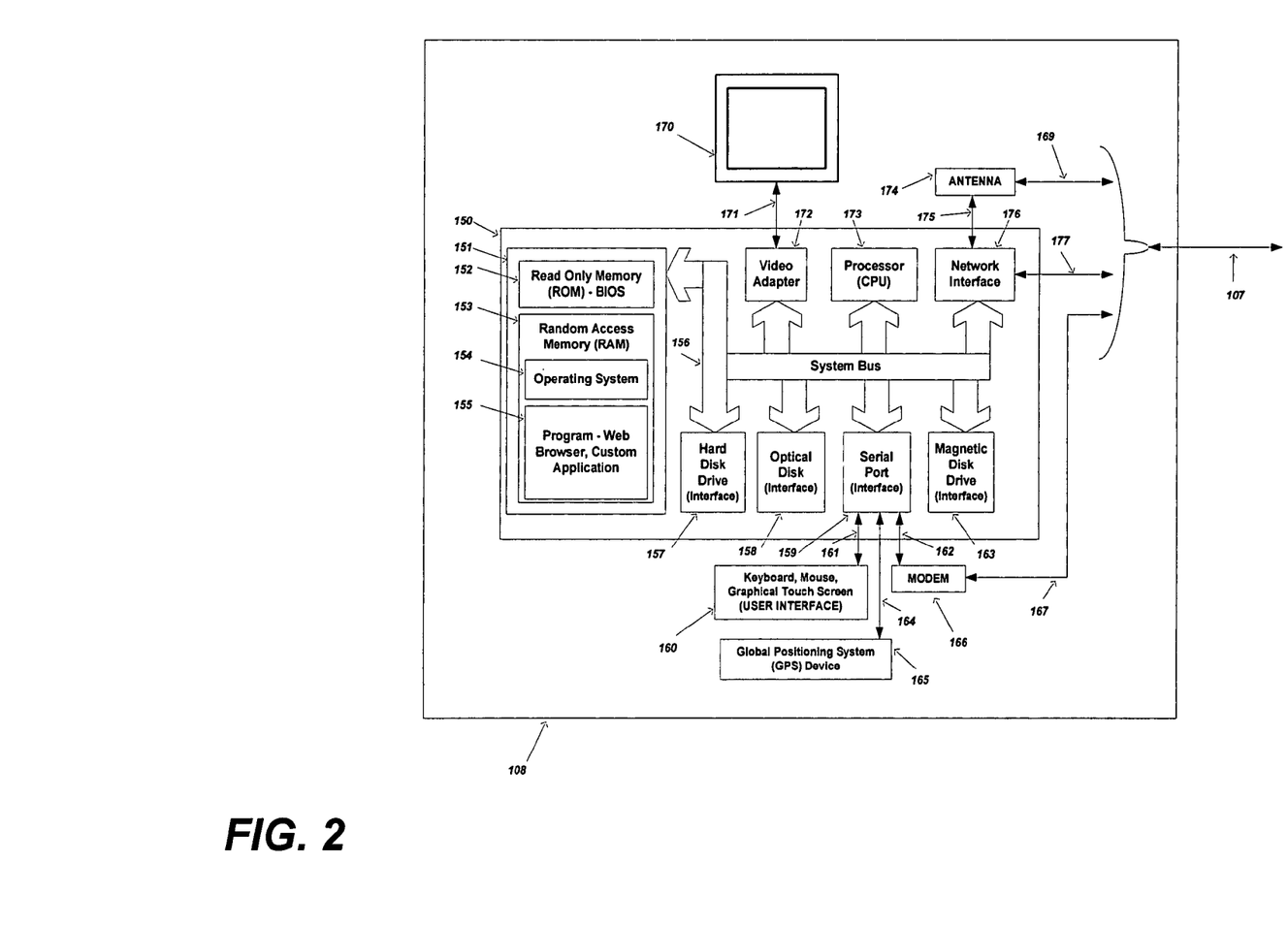
FIG. 2 illustrates one embodiment of the present invention showing a personal computer with an integrated web browser.

FIG. 1 and FIG. 2 illustrate high-level diagrams of one embodiment that is a suitable computing and networking environment in which the invention may be implemented. The invention will be described in the general context of an application that executes on an operating system in conjunction with a personal computer or server, but those skilled in the art will realize that this invention may also be implemented in combination with other program modules. Program modules typically include routines, programs, data structures, etc. that perform particular tasks or implement particular abstract data types. This invention is not limited to a typical personal computer, but may also be utilized with other computing systems, such as handheld devices, mobile lap top computers, wireless phones, in-vehicle navigation systems, programmable consumer electronics, mainframe computers, distributed computer systems, etc., and the like.

FIG. 1 is a network block diagram illustrating the connection (125 & 101) of both wireless 100 and wired 126 Telecommunication devices to an Application Service Provider (ASP) 123, also referred to as an online server system. This online server system may be configured at a single location and on a single computer, or can be configured as a distributed computer system and at different locations. The wireless Mobile Telecommunication Devices 100 are wirelessly connected 101 to a nearby wireless base station 102, which are typically connected or have access to 105 the Internet, Intranet, or Extranet 106. Additionally, a landline Telecommunication Device 126 is typically connected to a nearby central office 124 which is connected or has access to 123 the Internet, Intranet, or Extranet 106. Additionally, the Application Service Provider (ASP) 123 also has access 109 to the Internet, Intranet, or Extranet 106. The ASP 123 generally consists of a front-end firewall and XML router 113 which itself has access (111 & 114 & 119) to other local computing modules, such as a database 112, POI server 115, geocoding server 116, mapping server 117, and webpage client server 118. The web-server front-end 118 can be connected to the outside Internet, Intranet, or Extranet 106 either through the local front-end firewall 113, or as in this embodiment, via 120 the web server 121, which is connected 122 directly to the Internet, Intranet, or Extranet 106 by using a software firewall which is well known to those skilled in the art. Additionally, either mobile 104 or landline 108 computing devices, such as a personal computer, are connected to the Internet, Intranet, or Extranet 106, either directly 107 or through a wireless connection 103 and base station 102.

FIG. 2 illustrates a typical personal computer 150, that includes a central processing unit (CPU) 173, video adapter 172, hard disk drive 157, optical disk 158, serial port 159, magnetic disk drive 163, system bus 156, and network interface 176→177 & 167 & 169→109. The hard disk drive 157 typically refers to a local non-volatile storage system for storing large amounts of data, such as a web browser program files or cookies or a user's Contact data. The optical disk 158 typically refers to a CD-ROM disk used for storing read-only data, such as an installation program. The serial port interface 159 is typically used to connect 161 the computer 150 to external devices 160, such as a keyboard, mouse, and graphical touch screen interface, and also can connect 164 to positioning devices 165, such as a GPS receiver. The keyboard and mouse 160, amongst other input devices 165, enable users to input information into the computer 150. The connection 161 & 164 cables can include a serial cable or universal serial bus (USB) cable. Other input devices, that are not shown, may include a joystick, scanner, camera, microphone, or the like. The magnetic disk drive 163 is typically used to store small amounts data, in comparison to a hard 157 or optical 158 disk drive, and typically lacks the data transfer rates of those other storage drives, but it enables both readable and writable capability. The hard disk drive 157, optical disk drive 158, serial port interface 159, and magnetic disk drive 163 are all connected to the main system bus 156 of the computer 150 for transferring data. A monitor 170 or other type of display device, such as a LCD display, is connected 171 to the computer system's 150 video adapter 172, which is connected to the system bus 156. Additional peripheral output devices, which are not included in this embodiment, such as a printer, speaker, etc., can also be connected to a personal computer 150. The system bus 156 also connects to the network interface 176, central processing unit (CPU) 173, and system memory 151. The system memory 151 contains both random access memory (RAM) 153, and read only memory (ROM) 152, that typically consists of the BIOS (Basic Input/Output System) of the computer, necessary for containing basic routines that enable the transfer of information between elements within the personal computer 150. The RAM 153 stores a number of program modules, such as the web browser and synchronization applications 155, and the Operating System 154 of the personal computing device 150 or personal computer 150. One example of such a program module 155 would be a web browser that is connected to the "AtlasLink" server that was previously mentioned.

Figure 3:
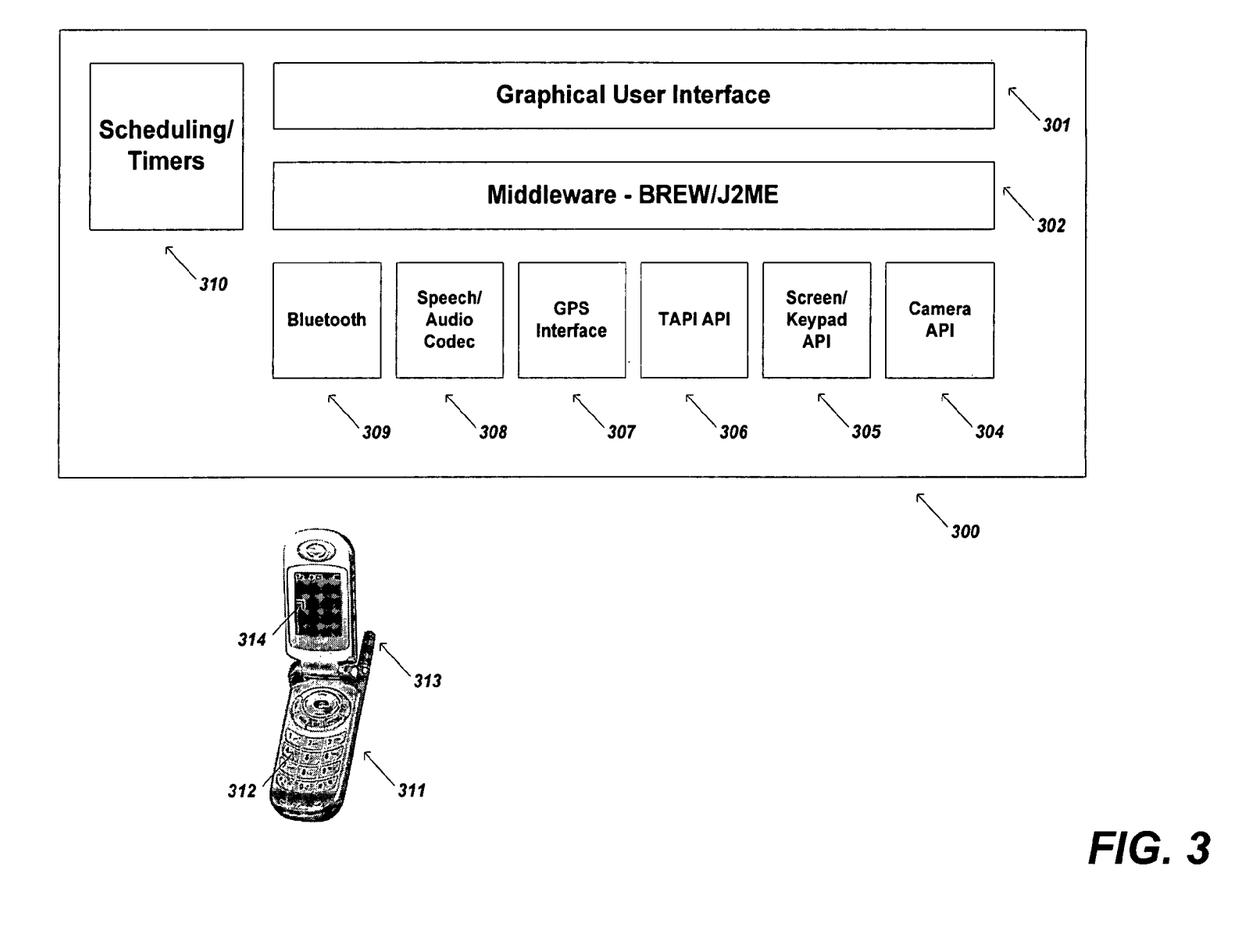
FIG. 3 illustrates one embodiment of the present invention of a wireless Telecommunication Device and an accompanying high-level block diagram of a wireless Telecommunication Device.

FIG. 3 illustrates a next generation wireless Telecommunication Device 311 which typically includes a display 314, an antenna 313, and a keypad 312. The next generation wireless Telecommunication Device 311 & 300, as illustrated in FIG. 3, provides a foundation 302 for running programs or applications that can access the Telecommunication Device's 311 internal interfaces, such as the Bluetooth 309, Speech/Audio Codec 308, GPS Interface 307, TAPI (Telephony Application Program Interface) 306 Interface, Screen/Keypad API (Application Program Interface) or Interface 305, Camera API 304, or the like as well known to those that are skilled in the art. As those that are skilled in the art will appreciate, a Telecommunication Device (300 & 311) will also include scheduling/timers 310 for scheduling specific events as is provided with standard computing platforms. Additionally, next generation Telecommunication Devices (300 & 311) have graphical user interfaces (GUI) 301 for applications to allow user input using a graphical display 314. As people skilled in the art will appreciate, these next generation Telecommunication Devices provide the means to access the Telecommunication Devices' internal APIs using a middleware 302 platform, such as J2ME or BREW, which are both well known to those skilled in the art. This simplifies the development process since there is significant support for obtaining developer access to the Telecommunication Device's internal APIs, such as the TAPI interface for making telephone calls and capturing call logs.

Figure 4:
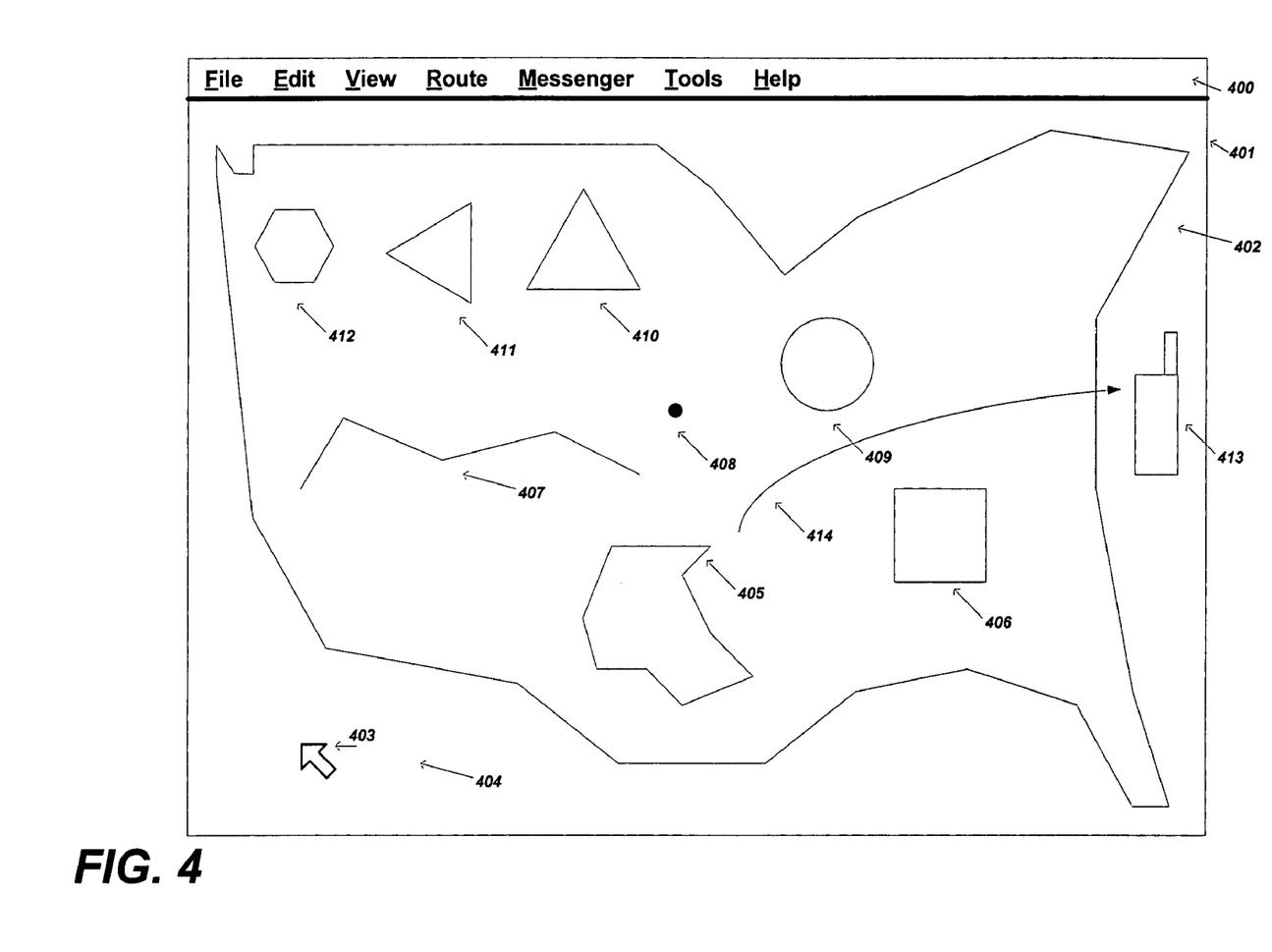
FIG. 4 illustrates one embodiment of a map view and various polygon and polyline map and POI objects.

The preferred embodiment for illustrating a mapping interface is shown in FIG. 4, this typically consists of a mapping program and/or web browser 401, a toolbar 400, a canvas for the map 402 & 404, a cursor for selecting objects 403. Contained in the map are a plurality of map objects 405 & 406 & 407 & 408 & 409 & 410 & 411 & 412 which have some shape to them that can be represented by a geofence. A user is able to select a map object, by which in this preferred embodiment a user would use a cursor 403, and then add it to a mobile device. In another embodiment, a user selects the map object 405 and then drags-and-drops 414 the object onto a representation of the mobile handset 413. In this embodiment, this operation will send the actual representation of the geofence to the mobile device. As those skilled in the art will appreciate, a geofence sent to the device will also incorporate a slight buffer region in order to mitigate false positives, which can be remotely configured on a device-by-device basis.

In another embodiment a user can select a category from a directory or Yellow Pages, such as parks. The results would return a list of parks, such as, but not limited to:
 1. Yosemite National Park
 2. Rocky Mountain Park
 3. Big Bear A user would then only need to select the desired park in the list using a standard GUI interface for the device, which can consist of a touch screen, rocker control (as used on a wireless device), etc. After the selection has been made, the geofence would be scheduled to be polled or pushed to the mobile location device for user-defined geofence event alerts.

Figure 5:
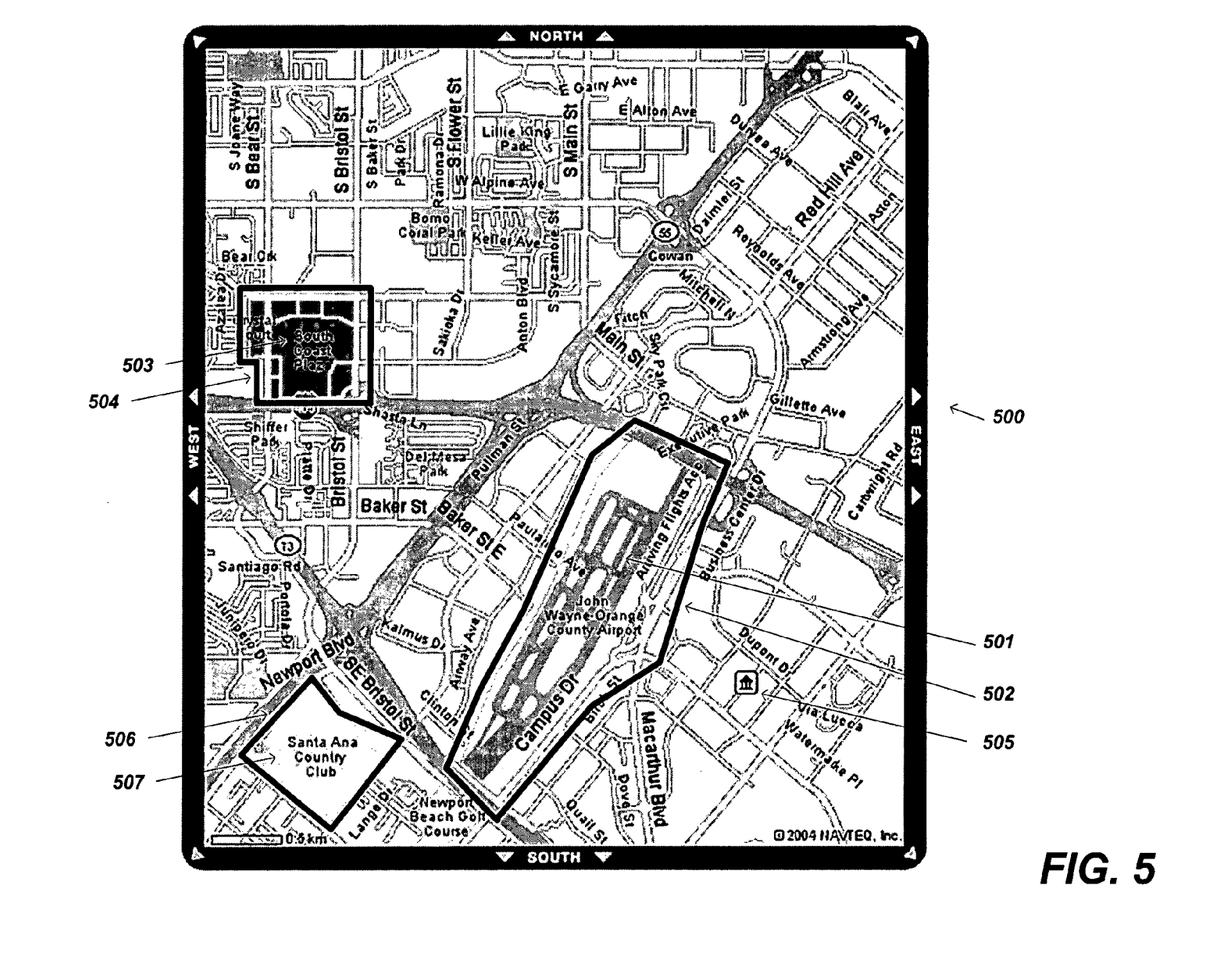
FIG. 5 illustrates one embodiment of the various spatial related objects and their respective geofences representations.

As shown in FIG. 5, there are a number of map objects shown in a map view 500 that can be represented using this "one selection" process, such as an Airport 501, Mall 503, Country Club 507, and an office at an address 505. When each one of these objects are "selected" using a plurality of means described in this invention, this invention's preferred embodiment for adding these geofences is to use the Douglas-Peucker algorithm to decimate the polygon, polyline, etc., to a minimal representation that outlines the desired spatial object, and for that decimated information to be sent to the mobile location device for geofence triggering.

Figure 6:
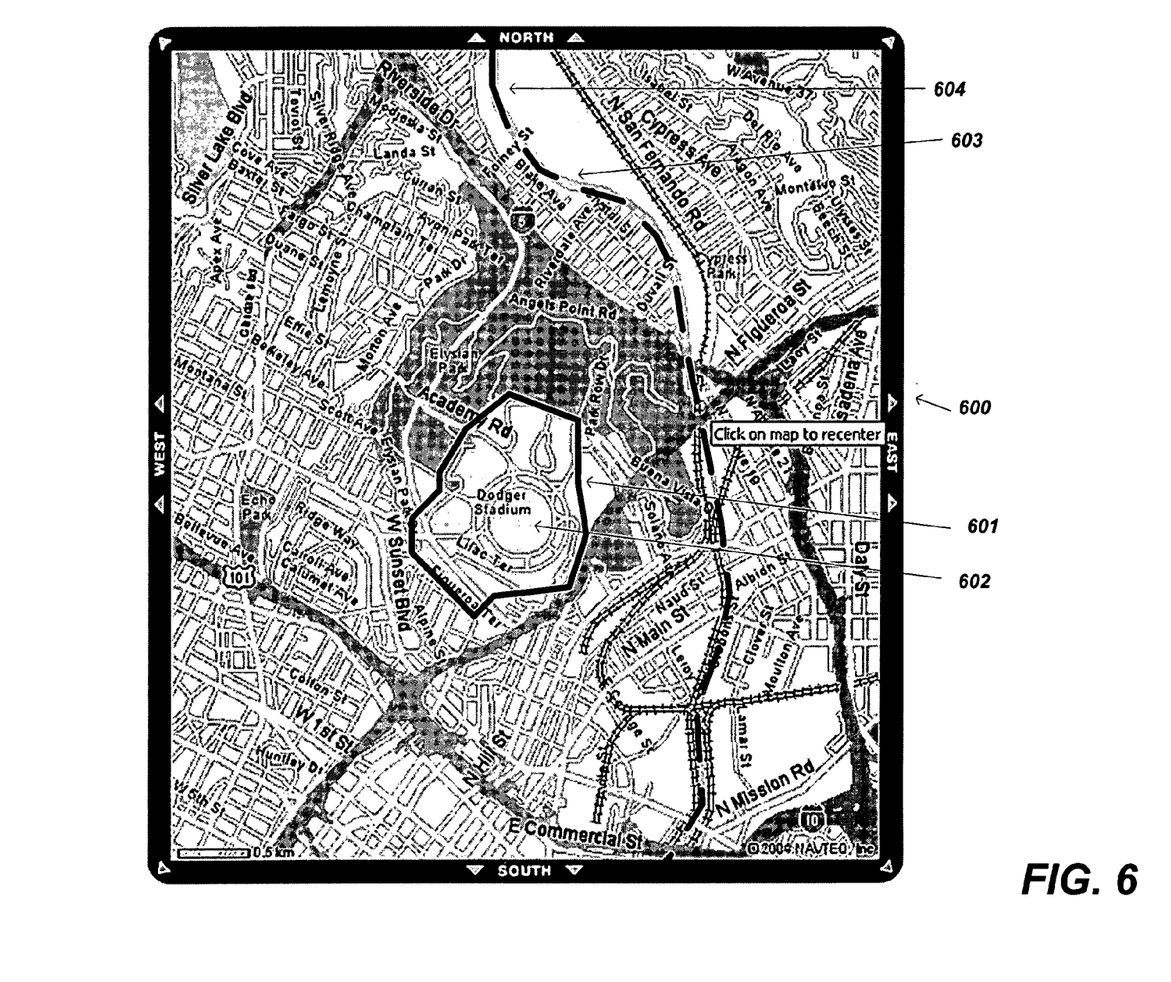
FIG. 6 illustrates another embodiment of the various spatial related objects and their respective geofences representations.

FIG. 6 illustrates other polygon and polyline items that can be geofenced from a map view 600, such as Dodger Stadium 602 and its geofenced representation 601. Additionally, a polyline, such as a river 603 can also have a geofenced representation 604 illustrated by a dashed line in this embodiment. For a polyline, a geofenced polygon and/or polyline with a boundary distance of D distance units that are perpendicular to the polyline that creates the geofenced boundary can be created for use in event alerts, etc., defined by the user.

Figure 7:
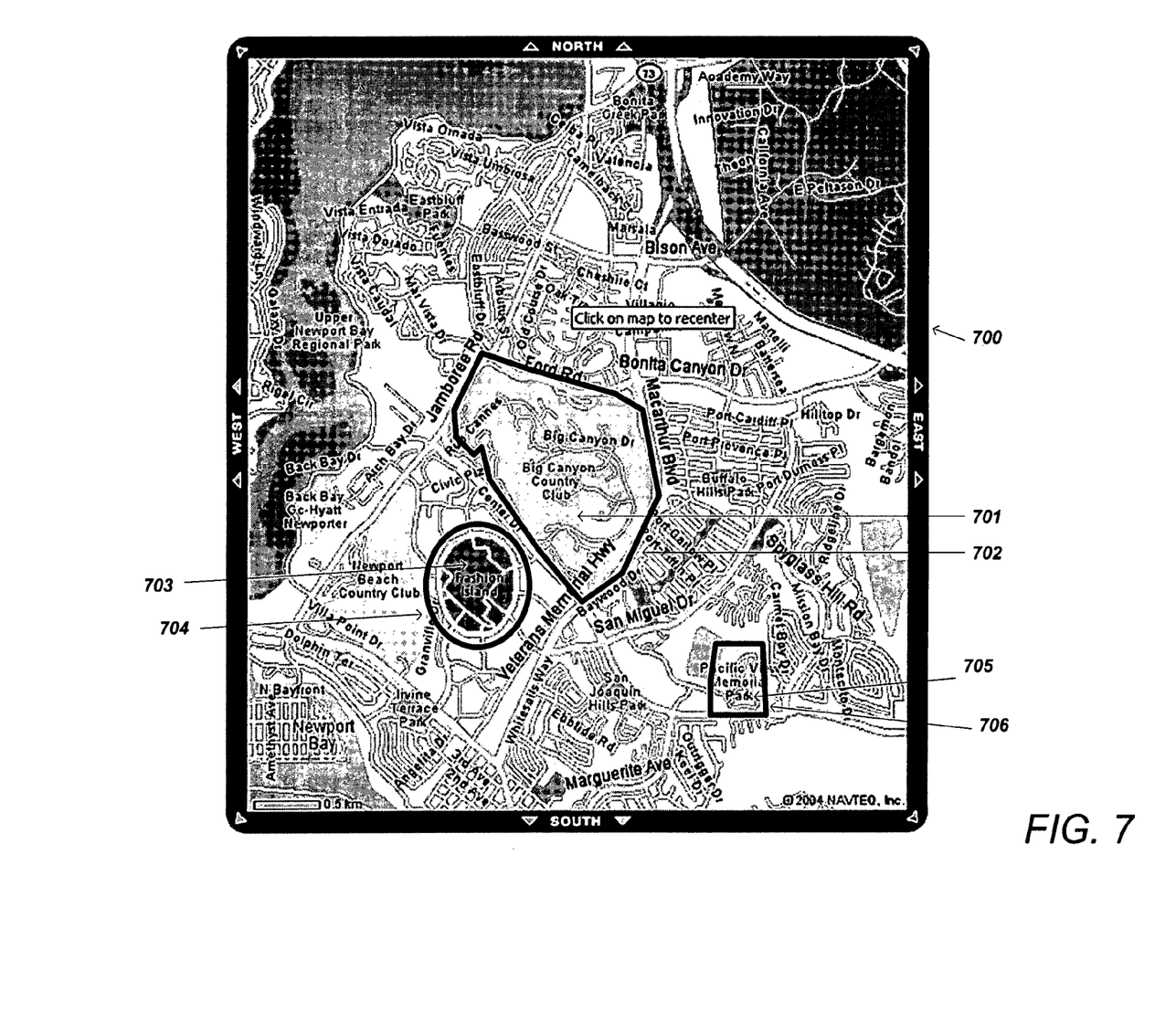
FIG. 7 illustrates yet another embodiment of the various spatial related objects and their respective geofences representations.

FIG. 7, illustrates various additional polygons 701 & 706 & 703 in a map view 700 and their respective geofenced representations 702 & 705 & 704 that are created using this "one selection" process for defining a geofenced boundary.

It should be noted that the present invention may be embodied in forms other than the preferred embodiments described above without departing from the spirit or essential characteristics thereof. The specification contained herein provides sufficient disclosure for one skilled in the art to implement the various embodiments of the present invention, including the preferred embodiment, which should be considered in all aspect as illustrative and not restrictive; all changes or alternatives that fall within the meaning and range or equivalency of the claim are intended to be embraced within.

What we claim:

1. A machine-readable storage medium containing a set of executable instructions for causing a computer to perform a one-select method for identifying a point of interest or map object and a geofence thereof on an electronically generated map, said method comprising the steps of:
    providing an electronic map including one or more points of interests or map objects;
    designating a particular point of interest or map object on said electronic map, said particular point of interest or map object being associated with a fixed location within the electronic map;
    generating geofence data associated with a geofence pre-defined for said particular point of interest or map object, said geofence being a virtual fixed boundary surrounding the particular point of interest or map object within said electronic map, wherein said geofence is represented by a spatial representation displayed in the electronic map;
    sending said geofence data to a mobile communication device upon a user selection of the spatial representation displayed in the electronic map; and
    generating a notification when the mobile communication device enters or exits an actual geographical area corresponding to said geofence.

2. The machine-readable storage medium of claim 1, wherein said geofence is defined along a default extent of said particular point of interest or map object, said default extent being a pre-recorded boundary of said point of interest or map object, wherein said default extent is variable with spatial data related to said particular point of interest or map object.

3. The machine-readable storage medium of claim 1, wherein said method further comprises the step of displaying the spatial representation that represents said geofence on said electronic map.

4. The machine-readable storage medium of claim 1, wherein said point of interest is one of a business establishment, religious establishment, recreational establishment, and educational establishment, and said map object is one of a river, stream, ocean, lake, mountain, forest, and reservoir.

5. The machine-readable storage medium of claim 1, wherein said method further comprises the step of determining a population density surrounding the point of interest or map object, wherein a default extent associated with the geofence is varied in accordance with the determined population density.

6. The machine-readable medium of claim 1, wherein said method further comprises the steps of:
    establishing a communication link with a wireless communication network; and
    sending said geofence data to the mobile communication device over the wireless communications network to enable a location-based application that generates the notification.

7. The machine-readable storage medium of claim 1, wherein said method further comprising the step of decimating the geofence data for sending to the mobile communications device.

8. The machine-readable storage medium of claim 7, wherein said step of decimation is performed using the Douglas-Peucker algorithm.

9. A method for identifying and selecting a point of interest or map object and a geofence thereof on an electronically generated map, said method comprising the steps of:
    providing an electronic map including one or more points of interests or map objects;
    designating a particular point of interest or map object on said electronic map, said particular point of interest or map object being associated with a fixed location within the electronic map; and
    generating geofence data associated with a geofence pre-defined for said particular point of interest or map object, said geofence being a virtual fixed boundary surrounding the particular point of interest or map object within said electronic map, wherein said geofence is represented by a spatial representation displayed on the electronic map;
    sending said geofence data to a mobile communication device upon a user selection of the spatial representation displayed in the electronic map; and
    generating a notification when the mobile communication device enters or exits an actual geographical area corresponding to said eofence.

10. The method of claim 9, wherein said geofence is defined along a default extent of said particular point of interest or map object, said default extent being a pre-recorded boundary of said point of interest or map object, wherein said default extent is variable with spatial data related to said particular point of interest or map object.

11. The method of claim 9, further comprising the step of displaying the spatial representation that represents said geofence on said electronic map.

12. The method of claim 9, wherein said point of interest is one of a business establishment, religious establishment, recreational establishment, and educational establishment, and said map object is one of a river, stream, ocean, lake, mountain, forest, and reservoir.

13. The method of claim 9, further comprising the step of determining a population density surrounding the point of interest or map object, wherein a default extent associated with of the geofence is varied in accordance with the determined population density.

14. The method of claim 9, further comprises the steps of:
    establishing a communication link with a wireless communication network; and
    sending said geofence data to the mobile communication device over the wireless communications network to enable a location-based application that generates the notification.

15. The method of claim 9, further comprising the step of decimating the geofence data for sending to the mobile communications device.

16. The method of claim 15, wherein said step of decimation is performed using the Douglas-Peucker algorithm.

17. The machine-readable storage medium of claim 1, wherein said geofence data includes data describing a buffer region associated with the geofence.

18. The method of claim 9, wherein said geofence data includes data describing a buffer region associated with the geofence.

19. A method for facilitating location-based applications using geofence data, said method comprising:
- providing an electronic map with at least one point of interest or map object displayed therein, said point of interest or map object defined by a geofence corresponding to a virtual fixed boundary surrounding said point of interest or map object in the electronic map;
- providing a user interface to select said point of interest or map object in said electronic map, said user interface displaying a plurality of spatial representations including at least one spatial representation that represents said geofence; and
- in response to selection of said point of interest map object, sending data associated with the geofence to a location-based application that generates a notification when a mobile device enters or exits an actual geographical area corresponding to the geofence.

20. The method of claim 19, wherein said user interface includes a display of multiple polygons, at least one of said polygons representing said geofence defining said point of interest or map object in said electronic map.

21. The method of claim 19, wherein said user interface includes a directory listing a plurality of points of interest or map objects including said map object in the form of descriptive text.

22. The method of claim 19, wherein said data associated with said geofence includes data describing a buffer region surrounding said point of interest or map object.

* * * * *